United States Patent
Linke et al.

(10) Patent No.: US 6,505,513 B1
(45) Date of Patent: Jan. 14, 2003

(54) ARRANGEMENT FOR MEASURING ROTATIONAL VELOCITY

(75) Inventors: Stephan Linke, Hamburg (DE); Hans-Werner Lütjens, Hamburg (DE); August Petersen, Henstedt-Ulzburg (DE); Bernd Seidel, Ahrensburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/483,918

(22) Filed: Jan. 18, 2000

(30) Foreign Application Priority Data

Jan. 21, 1999 (DE) .......................... 199 02 188

(51) Int. Cl.$^7$ .............................. G01P 15/10; G01B 7/30
(52) U.S. Cl. ................................ 73/514.29; 324/207.25
(58) Field of Search .............................. 73/514.39, 488; 324/160, 200, 207.11, 207.25

(56) References Cited

U.S. PATENT DOCUMENTS

| | | | | |
|---|---|---|---|---|
| 5,877,625 A | * | 3/1999 | Togo et al. | 324/174 |
| 5,880,585 A | * | 3/1999 | Oguro | 324/174 |
| 5,923,163 A | * | 7/1999 | Stuible et al. | 324/160 |
| 6,084,400 A | * | 7/2000 | Steinich et al. | 324/207.13 |
| 6,104,187 A | * | 8/2000 | Marx et al. | 324/207.21 |

* cited by examiner

*Primary Examiner*—Richard A. Moller
(74) *Attorney, Agent, or Firm*—Michael E. Belk

(57) ABSTRACT

In an arrangement for measuring the rotational velocity of a rotatable wheel (21) at or in a vehicle (23) by means of a sensor (1) which is manufactured by a thin-film technology, which comprises magnetoresistive sensor elements (11, 12, 13, 14), and which measures a magnetic field modulated by means of a toothed structure (22) of the wheel (21) in dependence on the rotational velocity thereof, an optimized guidance of interference currents which may be induced through radiation from electromagnetic fields is achieved in that an electrically conducting layer (5) is provided at the outside of the sensor (1), which layer (5) reduces a capacitive coupling between the wheel (21) and the sensor elements (11, 12, 13, 14) which would occur without said layer (5), and which layer (5) in its turn is capacitively coupled to the wheel (21), in that the electrically conducting layer (5), which is made of a metal material, is manufactured by a thin-film technique at least at one side of the sensor (1) by means of layer deposition on an insulating layer (4) and has a layer thickness of approximately 0.2 to 3 μm,
  in that the electrically conducting layer (5) is electrically contacted outside the substrate (3) on which the sensor elements (11, 12, 13, 14) are built up,
  in that the electrical contacting (10) is provided by means not using the thin-film technology, and
  in that a coupling of the electrically conducting layer (5) to a reference potential is realized by means of said electrical contacting (10).

10 Claims, 2 Drawing Sheets

ARRANGEMENT FOR MEASURING ROTATIONAL VELOCITY

BACKGROUND OF THE INVENTION

The invention relates to an arrangement for measuring the rotary velocity of a rotatable wheel mounted on a vehicle by means of a sensor formed by thin-film technology. The sensor comprises magnetoresistive sensor elements, and enable measurement of a magnetic field which is modulated by the structure of the wheel in dependence on the rotary velocity thereof.

In such arrangements, which are often used in vehicles for measuring the velocity of a wheel on which the vehicle moves, it is sought to maintain the highest possible insensitivity to electromagnetic radiation coming from the outside, usually referred to as a better EMC behavior. A capacitance is formed between the sensor or the sensor elements thereof on the one hand and the wheel, which is usually made of metal, on the other hand, which capacitance forms a current path for interference currents induced by electromagnetic fields. If this current path is closed, which is usually also the case owing to other capacitances in other places in the vehicle, an interference current will be formed which is superimposed on the signals of the sensor elements and which accordingly interferes with or prevents an evaluation of the sensor signal.

SUMMARY OF THE INVENTION

It is an object of the invention to provide develop an arrangement of the kind mentioned in the opening paragraph which is less sensitive to interference currents caused by radiated electromagnetic fields, which may possibly also originate outside the sensor.

According to the invention, this object is achieved in that an electrically conducting layer is provided at the outside of the sensor, which layer reduces the capacitive coupling between the wheel and the sensor elements which would occur without said layer, and which layer in its turn is capacitively coupled to the wheel. The electrically conducting layer, which is made of a metal material, is formed by a thin-film technique at least at one side of the sensor, by deposition thereof on an insulating layer. The conducting layer thickness is approximately 0.2 to 3 $\mu$m. in that the electrically conducting layer is electrically contacted outside the substrate on which the sensor elements are built up, the electrical contact being provided without using the thin-film technology. The electrically conducting layer is coupled to a reference potential by means of said electrical contact.

The electrically conducting layer at one side of the sensor has the function of reducing the capacitive coupling between the sensor elements of the sensor on the one hand and the wheel and its toothed structure on the other hand. It is achieved thereby that high-frequency currents induced by electromagnetic fields outside the sensor or the sensor elements flow through the capacitance formed between the electrically conducting layer and the wheel. The capacitance between the sensor elements and the wheel, which is still present as before, is reduced thereby, so that the interference currents flowing across this capacitance are reduced, usually considerably reduced. A new path is thus formed for radiation-induced interference currents by the electrically conducting layer, which path guides the interference currents away from the sensor elements.

The layer must be made of metal and be electrically conducting if it is to form the capacitance as effectively as possible. Advantageously, according to the invention, it is formed by thin-film technology, so that it can be manufactured during the same manufacturing process as the sensor elements. The electrically conducting layer is manufactured on an insulation layer, so that complete insulation between the electrically conducting layer and the sensor elements of the sensor is safeguarded. The electrically conducting layer has a layer thickness of approximately 0.2 to 3 $\mu$m, so that it is of itself so thin that electromagnetic fields acting on the electrically conducting layer from the outside do not form interference currents in this layer itself, which would be undesirable.

According to a further characteristic of the invention, the electrically conducting layer is electrically contacted exclusively outside the substrate on which the sensor elements are manufactured. This has the advantage in particular that it can be tested whether complete electrical insulation has been obtained between the layers in which the sensor elements are formed and the electrically conducting layer after the manufacture of the sensor elements, the insulation layer, and the electrically conducting layer, but before the electrically conducting layer is contacted. This can be measured first. Only then, advantageously, can the electrically conducting layer be electrically contacted outside the substrate. This electrical contact is achieved by means which do not form part of thin-film technology, i.e. the other than those used for thin-film manufacture of the layers of the sensor elements, the insulating layer, and the electrically conducting layer.

The electrically conducting layer is coupled via an electrical contact to a reference potential which corresponds to the reference potential of the sensor, so as to create a capacitive coupling between the electrically conducting layer and the wheel in an optimum manner.

It is achieved with this arrangement that high-frequency interference currents caused by radiation from electromagnetic fields not only in the sensor, but also, for example, in its supply lines preferably flow through the capacitance formed between the electrically conducting layer and the wheel of the vehicle. Interference currents across the sensor elements are thereby reduced, or possibly substantially eliminated, so that the currents supplied by the sensor elements which serve to measure the rotational velocity are considerably less affected by HF interference currents.

Furthermore, the construction of the electrically conducting layer is achieved in a simple manner because thin-film technology is used for manufacturing this layer and also the subjacent insulation layer, using the same means as far the manufacture of the sensor and the sensor elements thereof.

A clearly reduced sensitivity of the sensor to electromagnetic interference radiation is achieved overall, while the additional expenditure required for this is small.

If the arrangement for measuring rotational velocity is used for an anti-blocking system, as in an embodiment of the invention; the reduced EMC is of particular importance in that the arrangement of the sensor in the wheelbox is particularly sensitive to electromagnetic radiation, while these sensors have supply lines which are also laid in particularly interference-sensitive regions of the vehicle.

The electrical contacting of the electrically conducting by contacts provided outside the substrate of the sensor elements may be advantageously achieved by means of bonding, as in a further embodiment of the invention. This is advantageous also because the electrical connections of the sensor elements to the sensor are usually also made by bonding. An electrical contact for bonding the electrically conducting layer can thus be manufactured in the same process step, so that this involves hardly any additional expenditure.

In a further embodiment of the invention, the electrically conducting layer advantageously covers the side of the sensor facing towards the wheel. The electrically conducting layer is capable of forming the desired capacitance between itself and the wheel and thus reducing the capacitance between the sensor and the wheel especially at this side.

The electrical signals supplied by the sensor elements are normally evaluated in a first stage by an evaluation circuit which is arranged in the immediate vicinity of the sensor elements. As provided for in a further embodiment of the invention, the electrically conducting layer may advantageously also cover this evaluation circuit at one side and thus improve the EMC further in that the path to the capacitance to the wheel is provided already in the region of the evaluation electronics.

The electrically conducting layer need not be a fully closed layer, instead, for example, it may have a comb structure for a further embodiment of the invention. Alternative structures are also conceivable as long as the object mentioned above is achieved.

Advantageously, the sensor comprises four magnetoresistive sensor elements forming a bridge. That provides a particularly good measurement and has found wide acceptance, in example, for ABS sensor applications.

BRIEF DESCRIPTION OF THE DRAWINGS

The invention will now be explained in more detail with reference to the drawings, in which.

DETAILED DESCRIPTION OF THE PREFERRED EMBODIMENTS

Figure 1:
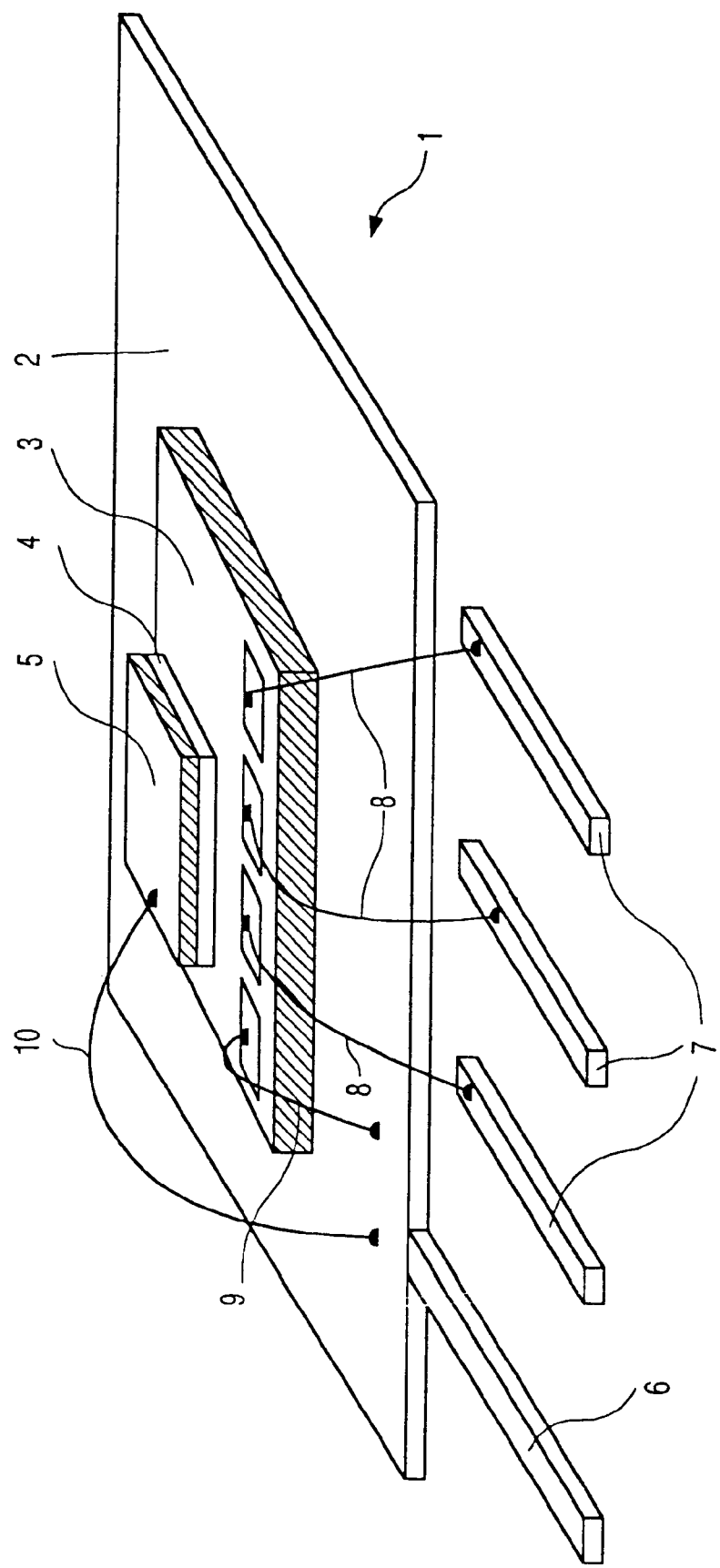
FIG. 1 shows a sensor in an arrangement according to the invention, partly in cross-section.

FIG. 1 first shows a sensor 1 only of an arrangement according to the invention. This sensor 1 is shown partly in cross-section.

The sensor 1 of is built up on a metal support 2 which on the one hand serves as a mechanical base and on the other hand is coupled to a reference potential. The sensor 1 comprises a sensor layer 3 manufactured by the thin-film technology. An insulation layer 4, shown only partly in FIG. 1, is present on the sensor layer 3. An electrically conducting layer 5 is provided on the insulation layer 4, also by thin-film technology means.

An electrical contacting 6 directly connected to the metal support 2 and coupled thereby to the reference potential is arranged at the outside of the substrate. Furthermore, three further contacts 7 are provided, coupled to corresponding connections of the sensor layer 3 via bond pads 8. Signals are supplied to and derived from the sensor elements via these connections 7. A bonding 9 is also provided by means of which the reference potential, to which the metal support 2 is coupled, is also supplied to the sensor elements.

The electrically conducting layer 5 is furthermore coupled to the metal support 2 by means of a further, bonding 10, so that also the electrically conducting layer 5, is coupled to the reference potential.

It is to be noted that the layers 4 and 5 are shown in cross-section only in the picture of FIG. 1. In actual fact, the insulation layer 4 and in particular the electrically conducting layer 5 cover the sensor layer 3 as fully as possible at one side, usefully the upper side in the representation of FIG. 1. Advantageously, this side is also the one which is arranged opposite a structuring of the wheel.

FIG. 1 shows that the insulation layer 4 and the electrically conducting layer 5 can be manufactured by thin-film technology means, as can the sensor layer 3. Two additional process steps are merely required for manufacturing the two layers; however, the same technology can be applied for this, so that the additional expenditure is small.

The full insulation between the electrically conducting layer 5 and the sensor layer 3 may be tested before the bonding 10 is made. It is advantageous not to make, the bonding 10 until after this has been done.

The effect of the electrically conducting layer 5 of the sensor 1 will be explained in more detail below with reference to FIG. 2, which diagrammatically depicts the electrical and physical interactions.

Figure 2:
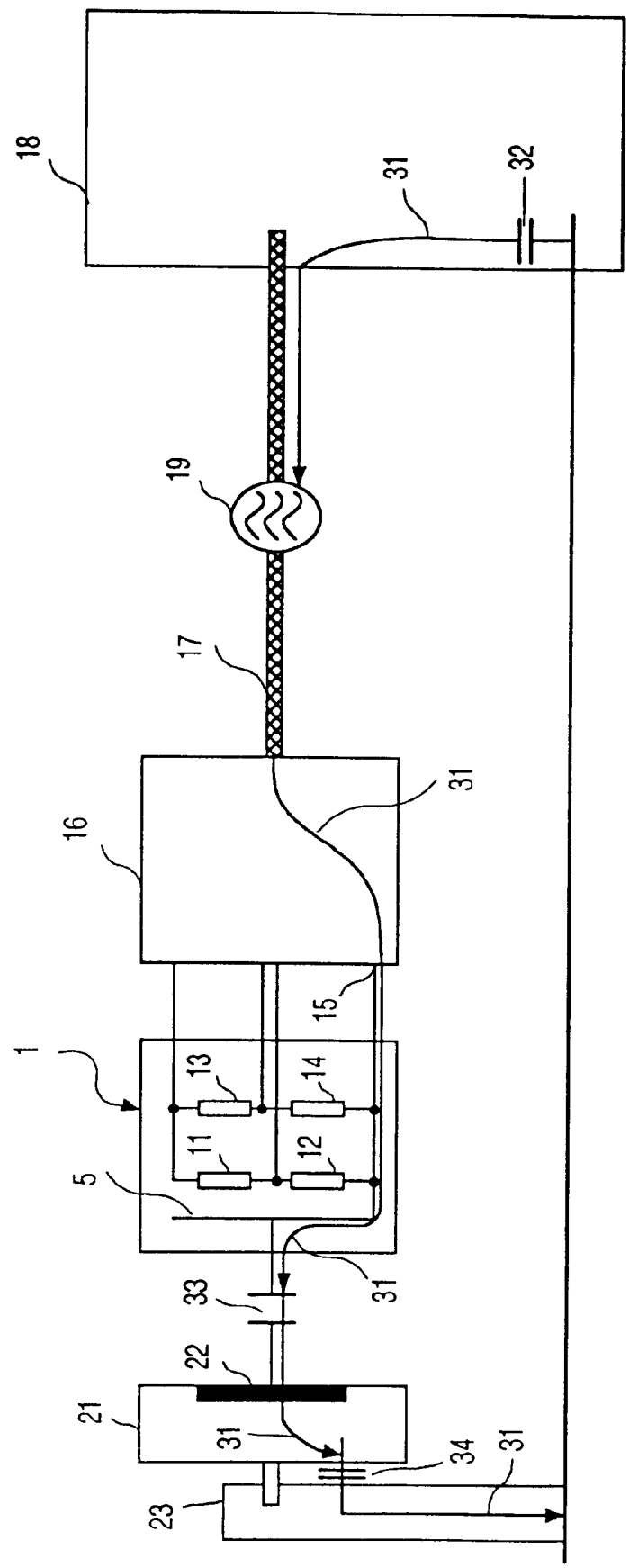
FIG. 2 is a circuit diagram of the arrangement according to the invention including the sensor of FIG. 1.

The sensor 1 is shown again in FIG. 2. It is shown as an electrical unit here, with the four sensor elements 11, 12, 13 and 14 being identified, forming a bridge and coupled to a downstream evaluation circuit 16 by means of connections 15. The electrically conducting layer 5 is shown inside the sensor 1.

The evaluation circuit 16 is connected via a wire connection 17 to further evaluation electronics 18, which may be, for example, ABS electronics.

The sensor 1 is positioned opposite a rotatable wheel 21 of a vehicle. This may be, for example, a wheel which is fixedly coupled to a wheel of the vehicle by means of which the latter can move. Such arrangements are known from ABS systems. A structuring 22 is applied on the wheel 21, which may be, for example, magnetized, or may comprise a multipole magnetized layer so as to generate a magnetic field which is modulated in dependence on the rotational velocity, which is measured by the sensor elements 11, 12, 13, 14, and which can be further evaluated by the circuits 16 and 18. The rotational velocity of the wheel 21 can be derived from the modulation frequency of this signal. Such systems are used, for example, for ABS sensors.

The wheel 21 is electrically directly or at least capacitively coupled to the vehicle 23 on which it is present.

It was found in practice for the electromagnetic compatibility of the entire system that an interference radiation is introduced not so much into the sensor 1 itself as, for example, into the electrical connection 17 between the two evaluation circuits. A high-frequency interference current is thus radiated into the line 17 by electromagnetic fields. A current source 19 is shown to represent this in FIG. 2 as an equivalent symbol, representing the generation of the interference current in the supply line 17.

Such radiated interference currents seek a path through which they can flow, for example in the arrangement in a vehicle as shown in FIG. 2. This path may be formed directly by an electrical connection, but it may also be closed through capacitive coupling.

This path is indicated by connections 31 in the Figure. This results partly in direct connections such as, for example, those between the evaluation electronics 18, the electrical connection line 17, the evaluation circuit 16, and the sensor 1.

A direct contacting is not present in many regions, so that the current will flow across capacitances. This may be the case, for example, in the region between the evaluation electronics 18 and the reference potential, across a capacitance 32. Furthermore, a capacitance 33 is also formed in the space between the sensor 1 and the wheel 21, across which the HF interference current may flow. The wheel 21 is connected either directly to the reference potential of the vehicle via a fastening 23, or at least a capacitance 34 is formed also in that location, across which the HF interference current can flow. Thus a closed current circuit for the induced HF interference current is formed through the direct connections mentioned above as well as through the capacitances 32, 33, 34, and possibly further capacitances present in the vehicle.

If the sensor 1 were constructed in accordance with the present state of the art, the electrically conducting layer 5 would not be present and the capacitance 33 would not arise between this electrically conducting layer 5 and the wheel 21, as shown in the Figure, but between the sensor 1 or its sensor elements 11, 12, 13, 14 on the one hand and the wheel on the other hand. The interference current would thus flow directly through the sensor elements 11, 12, 13, 14 and/or their supply lines and would interfere with the evaluation of their signals.

According to the invention, however, the electrically conducting layer 5 is provided, achieving on its part a good capacitive coupling with the wheel 21 by means of the capacitance 33. This capacitance 33 thus arises mainly between the electrically conducting layer 5 and the wheel 21. The HF interference current accordingly flows mainly across this capacitance 33 between the electrically conducting layer 5 and the wheel 21. This has the result that the interference current is substantially absent in the regions of the sensor elements 11, 12, 13, 14 and/or their connection lines 15. The evaluation signals of the sensor elements 11, 12, 13, 14, 15 have thus been substantially freed of interference. A new path has been formed for the interference current as a result of the electrically conducting layer, guiding this current away from the regions of the sensor elements.

It is immaterial in this arrangement where exactly the interference current is coupled in. The decisive factor is that the capacitive coupling between the sensor elements 11, 12, 13, 14 on the one hand and the wheel 21 on the other hand is substantially reduced by the electrically conducting layer 5, and instead a capacitance effective for HF interference currents has been formed between the electrically conducting layer 5 and the wheel 21. The arrangement according to the invention can thus be advantageously utilized for improving the EMC behavior, whereby the signals of the sensors 11, 12, 13, 14 are successfully freed from interference in all cases, irrespective of where the HF interference current is radiated into the system. This renders the arrangement according to the invention universally applicable, while on the other hand it requires little additional expenditure for interference elimination.

What is claimed is:

1. An arrangement for measuring the rotary velocity of a rotatable wheel mounted to or in a vehicle, comprising:
    a sensor manufactured by the thin-film technology, including magnetoresistive sensor elements, the sensor measuring a magnetic field which is modulated by a structure of the wheel depending on the rotary velocity of the wheel; and
    an electrically conducting layer manufactured by thin-film technology at the outside of the sensor, which layer reduces a capacitive coupling between the wheel and the sensor elements which would occur without the layer, and which layer is capacitively coupled to the wheel;
    and in which:
        the electrically conducting layer, is made of a metal material, is manufactured by a thin-film technique at least at one side of the sensor by layer deposition on an insulating layer, and has a layer thickness of approximately 0.2 to 3 $\mu$m;
        the electrically conducting layer is electrically connected outside a substrate on which the sensor elements are built up;
        an electrical connection is provided subsequent to forming the thin-film technology; and
        the electrically conducting layer is connected to a reference potential by the electrical connection.

2. An arrangement as claimed in claim 1, in which the vehicle wheel is fixedly coupled so as to rotate along with a vehicle wheel on which the vehicle is movable, and in that the sensor is provided as a rotational velocity sensor for an ABS of the vehicle.

3. An arrangement as claimed in claim 1, in which the electrical connection of the electrically conducting layer is provided by bonding to the sensor.

4. An arrangement as claimed in claim 1, in which the electrically conducting layer fully shields the sensor elements at least at the side of the sensor facing towards the wheel.

5. An arrangement as claimed in claim 1, in which output signals of the sensor elements are evaluated by an evaluation circuit, and in that the electrically conducting layer also covers the evaluation circuit at least at one side.

6. An arrangement as claimed in claim 1, in which the electrically conducting layer has a comb structure.

7. An arrangement as claimed in claim 1, in which the structure of the wheel is realized as a multipole magnetization of the wheel or as a multipole magnetized layer on the wheel.

8. An arrangement as claimed in claim 1, in which a permanent magnet is provided on the side of the sensor facing away from the wheel.

9. An arrangement as claimed in claim 1, in which the sensor comprises magnetoresistive sensor elements which are arranged on a support plate and which form a double bridge circuit.

10. A sensor for an arrangement for measuring the rotational velocity of a rotatable wheel at or in a vehicle, wherein the sensor is manufactured by means of thin-film technology and comprises:
    magnetoresistive sensor elements wherein a magnetic field modulated by means of a structuring of the wheel depending on the rotational velocity of the wheel is measured by the sensor;
    an electrically conducting layer provided at the outside of the sensor, which layer reduces a capacitive coupling between the wheel and the sensor elements which would occur without the layer, and which layer is capacitively coupled to the wheel;
    and in which:
        the electrically conducting layer is made of a metal material, is manufactured by a thin-film technique at least at one side of the sensor by layer deposition on an insulating layer, and has a layer thickness of approximately 0.2 to 3 $\mu$m;
        the electrically conducting layer is electrically connected outside the substrate on which the sensor elements are built up;
        the electrical connection is provided subsequent to forming the magnetoresistive elements; and
        the electrically conducting layer is coupled to a reference potential by the electrical connection.

* * * * *